United States Patent
Song et al.

(10) Patent No.: US 9,505,629 B2
(45) Date of Patent: *Nov. 29, 2016

(54) METHOD OF PREPARING CALCIUM CARBONATE USING DIRECT CARBONATION REACTION

(71) Applicant: KOREA INSTITUTE OF GEOSCIENCE AND MINERAL RESOURCES, Daejeon (KR)

(72) Inventors: Kyungsun Song, Daejeon (KR); Young-Nam Jang, Daejeon (KR); Soo-Chun Chae, Seoul (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,201

(22) Filed: Aug. 15, 2014

(65) Prior Publication Data

US 2015/0050206 A1 Feb. 19, 2015

(30) Foreign Application Priority Data

Aug. 19, 2013 (KR) .................. 10-2013-0097853
Sep. 26, 2013 (KR) .................. 10-2013-0114489

(51) Int. Cl.
*C01F 11/18* (2006.01)
*C01C 1/24* (2006.01)

(52) U.S. Cl.
CPC .............. *C01F 11/181* (2013.01); *C01C 1/24* (2013.01); *C01P 2002/30* (2013.01); *C01P 2002/72* (2013.01); *C01P 2002/85* (2013.01); *C01P 2004/03* (2013.01); *C01P 2004/38* (2013.01); *C01P 2004/45* (2013.01); *C01P 2004/61* (2013.01); *C01P 2006/80* (2013.01)

(58) Field of Classification Search
CPC .................................................. C01F 11/181
See application file for complete search history.

(56) References Cited

U.S. PATENT DOCUMENTS

| | | | | |
|---|---|---|---|---|
| 2,640,757 A | * | 6/1953 | Robinson | C01C 1/244 423/431 |
| 4,201,754 A | * | 5/1980 | Clark | C01C 1/028 423/243.02 |
| 5,939,036 A | * | 8/1999 | Porter | C01F 11/18 423/165 |

FOREIGN PATENT DOCUMENTS

| | | |
|---|---|---|
| JP | 2001-000947 | 1/2001 |
| JP | 2001000947 A | 1/2001 |
| KR | 10-1999-0068629 | 9/1999 |
| KR | 10-0723066 | 5/2007 |
| KR | 10-2010-0008342 | 1/2010 |
| KR | 10-2013-0009705 A | 1/2013 |
| KR | 10-2013-0026121 A | 3/2013 |

OTHER PUBLICATIONS

Song, et al., "Precipitation of calcium carbonate during direct acqueous carbonation of flue gas desulfurization gypsum," Chemical Engineering Journal 213(2012) 251-258.
Lee, Myung-gyu et al., Mineral Carbonation of flue gas desulfurization gypsum for $CO_2$ sequestration, Energy 47, 2012, documents can be retrieved at www.elsevier.com/locate/energy, 8 pages.
Korean Notice of Allowance with English Translation for Application No. 10-2013-0097853, mailed on Jan. 27, 2015, 4 pages.
Korean Notice of Submission of Opinion with English Translation for Application No. 10-2013-0114489, dated Jan. 29, 2015, 11 pages.
U.S. Office action dated Jun. 10, 2015, for cross reference U.S. Appl. No. 14/232,833, (5 pages).
U.S. Notice of Allowance dated Sep. 25, 2015, for cross reference U.S. Appl. No. 14/232,833, (5 pages).

* cited by examiner

*Primary Examiner* — Stuart Hendrickson
(74) *Attorney, Agent, or Firm* — Lewis Roca Rothgerber Christie LLP

(57) ABSTRACT

Disclosed is a method of preparing calcium carbonate using a direct carbonation reaction. The method includes dissolving fuel gas desulfurization gypsum into an ammonia solution, performing a filtering process after making a carbonation reaction by feeding carbon dioxide into the ammonia solution in which the fuel gas desulfurization gypsum is dissolved, and performing a filtering process after precipitating the calcium carbonate by maintaining a filtered solution in a stationary state.

11 Claims, 25 Drawing Sheets

METHOD OF PREPARING CALCIUM CARBONATE USING DIRECT CARBONATION REACTION

CROSS-REFERENCE TO RELATED APPLICATION

This application claims priority to Korean Patent Application No. 10-2013-0097853 filed on Aug. 19, 2013 and Korean Patent Application NO. 10-2013-0114489 filed on Sep. 26, 2013 and all the benefits accruing therefrom under 35 U.S.C. §119, the contents of which is incorporated by reference in its entirety.

BACKGROUND OF THE INVENTION

1) Field of the Invention

The present invention relates to a method of preparing calcium carbonate using a direct carbonation reaction.

2) Background of Related Art

Recently, as power consumption is significantly increased every year with the industry development and the improvement in the quality of life, a greater amount of fossil fuel has been consumed. Accordingly, an emission amount of sulfur dioxide gas has been increased. Therefore, a flue-gas desulfurization system to remove sulfur dioxide gas has been continuously increased, so that an amount of flue-gas desulfurization gypsum to be treated is gradually increased. In order to utilize the flue gas desulfurization gypsum, ammonium sulfate fertilizer has been produced. Simultaneously, calcium carbonate, which is a byproduct of the ammonium sulfate fertilizer, has been produced. The calcium carbonate may be commercially utilized according to the purity and the forms thereof. According to the related art, in order to treat the flue gas desulfurization gypsum, two consecutive reaction steps are performed as expressed in chemical formula 1.

$$CO_2(g) + 2NH_4OH \rightarrow (NH_4)_2CO_3(aq)$$

$$CaSO_4 \cdot 2H_2O + (NH_4)_2CO_3(aq) \rightarrow CaCO_3(s) + (NH_4)_2SO_4 + 2H_2O \quad \text{[Chemical formula 1]}$$

The ammonium sulfate having high product yield and high purity can be produced through the reaction. The purity of the ammonium sulfate is increased since most residues of the flue gas desulfurization gypsum remain in the form of solid residues. In addition, if impurities remain in the ammonium sulfate, the impurities may be simply filtrated from the ammonium sulfate. When taking into consideration the solubility of the ammonium sulfate and the calcium carbonate, the ammonium sulfate remains in a solution since the ammonium sulfate has high solubility, and most parts of the calcium carbonate is precipitated without being dissolved. Accordingly, the crystal of the ammonium sulfate having the high purity can be obtained after the insoluble impurities has been removed through a filtering process and the precipitation has been performed. Meanwhile, since the calcium carbonate has low solubility, calcium carbonate having high purity may not be obtained through the above method.

As the related art, there is provided "sequestration of carbon dioxide by the waste gypsum" disclosed in Korean Unexamined Patent Publication No. 10-2010-0008342 (published on Jan. 25, 2010).

SUMMARY OF THE INVENTION

The present invention is to provide a method of preparing calcium carbonate having high purity through a direct carbonation reaction in which carbon dioxide is applied to flue gas desulfurization gypsum.

The present invention suggests several object(s) without limitation to the above object(s), and other object(s), which are not described, can be clearly comprehended from the following description by those skilled in the art.

In order to accomplish the above object, there is provided a method of preparing calcium carbonate using a direct carbonation reaction. The method includes dissolving flue gas desulfurization gypsum into an ammonia solution, performing a filtering process after making a carbonation reaction by feeding carbon dioxide into the ammonia solution in which the flue gas desulfurization gypsum is dissolved, and performing a filtering process after precipitating the calcium carbonate by maintaining a filtered solution in a stationary state.

An ammonia concentration in the ammonia solution is in a range of 4% by volume to 12% by volume.

A solid dosage of the flue gas desulfurization gypsum to the ammonia solution is in a range of 5 g/L to 20 g/L.

The dissolving of the flue gas desulfurization gypsum into the ammonia solution comprises performing an agitating process at a rate in a range of 350 rpm to 450 rpm for five minutes.

A concentration of the flue gas desulfurization gypsum in the ammonia solution is in a range of 30 mM to 110 mM.

The carbon dioxide is fed at a flow rate in a range of 1 L/min to 3 L/min.

The carbonation reaction is performed for five minutes to 20 minutes.

The carbonation reaction is performed at a normal temperature and a normal pressure.

The carbonation reaction is completed at pH 7.

The filtering process is performed by a 0.2 μm membrane filter, and the 0.2 μm membrane filter includes cellulose acetate.

In addition, the present invention may further include crystallizing the filtered solution after precipitating the calcium carbonate.

In addition, the present invention may further include adjusting a pH of the ammonia solution, in which the flue gas desulfurization gypsum is dissolved, to at least 9.0 in the carbonation reaction.

The calcium carbonate includes calcite and vaterite crystal forms.

In addition, there is provided a method of determining a formation efficiency of calcium carbonate. The method includes dissolving flue gas desulfurization gypsum into an ammonia solution, performing a filtering process after making a carbonation reaction by feeding carbon dioxide into the ammonia solution in which the flue gas desulfurization gypsum is dissolved, and performing a filtering process after precipitating the calcium carbonate by maintaining a filtered solution in a stationary state. A formation efficiency of the calcium carbonate through the carbonation reaction is determined by Equations 1 and 2, $$\text{Formation efficiency} = \frac{(M_{Ca\text{-}f} - M_{Ca\text{-}f'})}{T_{Ca\text{-}s}} \times 100 \quad \text{[Equation 1]}$$

$$\text{Formation efficiency} = \frac{(M_{Ca\text{-}f} - M_{Ca\text{-}f'})}{T_{SO_4\text{-}g}} \times 100 \quad \text{[Equation 2]}$$

in which $M_{Ca\text{-}f}$ represents total concentration of calcium in the filtered solution after the carbonation reaction, $M_{Ca\text{-}f'}$ represents concentration of calcium in the solution after the calcium carbonate is precipitated, $T_{Ca\text{-}g}$ represents the total concentration of calcium of the flue gas desulfurization gypsum, and $T_{SO4-g}$ represents total concentration of $SO_4$ of the flue gas desulfurization gypsum.

According to the present invention, the direct carbonation reaction is performed at a normal temperature and a normal pressure, thereby improving carbonation reactivity of the flue gas desulfurization gypsum. In addition, after making the carbonation reaction for a specific time (induction time), the filtered liquid is maintained in the stationary state to precipitate the calcium carbonate having high purity.

In addition, the direction carbonation reaction is performed at the normal temperature and the normal pressure, so that the calcium carbonate having the vaterite crystal representing 100% of whiteness can be simply prepared.

Further, $CO_2$ is not emitted again from the calcium carbonate prepared after injecting $CO_2$, so that environmental pollution can be prevented due to the emission of $CO_2$.

BRIEF DESCRIPTION OF DRAWINGS

FIG. 16 (b) illustrates graphs showing dissolved calcium carbonate concentration according to carbonation time in the preparation method according to the present invention.

DETAILED DESCRIPTION OF THE INVENTION

Hereinafter, an exemplary embodiment of the present invention will be described in detail with reference to accompanying drawings.

The advantages, the features, and schemes of achieving the advantages and features of the present invention will be apparently comprehended by those skilled in the art based on the embodiments, which are detailed later in detail, together with accompanying drawings.

The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

In addition, the detailed descriptions of well-known techniques incorporated herein may be omitted when they make the subject matter rather unclear.

The present invention provides a method of preparing calcium carbonate using direct carbonation reaction, which includes a step of dissolving flue gas desulfurization gypsum into an ammonia solution, a step of performing filtering after making a carbonation reaction by feeding carbon dioxide ($CO_2$) into the ammonia solution in which the flue gas desulfurization gypsum is dissolved, and a step of performing filtering after precipitating the calcium carbonate by maintaining the filtered solution in a stationary state.

The method of preparing the calcium carbonate using the direct carbonation reaction according to the present invention is performed at a normal temperature and normal pressure, so that the flue gas desulfurization gypsum represents high calcium carbonate reactivity. The calcium carbonate having high purify can be prepared by making the carbonation reaction for an induction period (a latency time until a precipitation reaction is regularly started due to the existence of impurities) before calcium carbonate is precipitated in the middle of the carbonation reaction, and calcium carbonate can be prepared with a high content from the flue gas desulfurization gypsum. In addition, the direct carbonation reaction is performed at the normal temperature and the normal pressure so that calcium carbonate having a vaterite crystal representing 100% of whiteness can be simply prepared. $CO_2$ is not emitted again from the calcium carbonate prepared after injecting $CO_2$, so that environmental pollution can be prevented due to the emission of $CO_2$.

Figure 1:
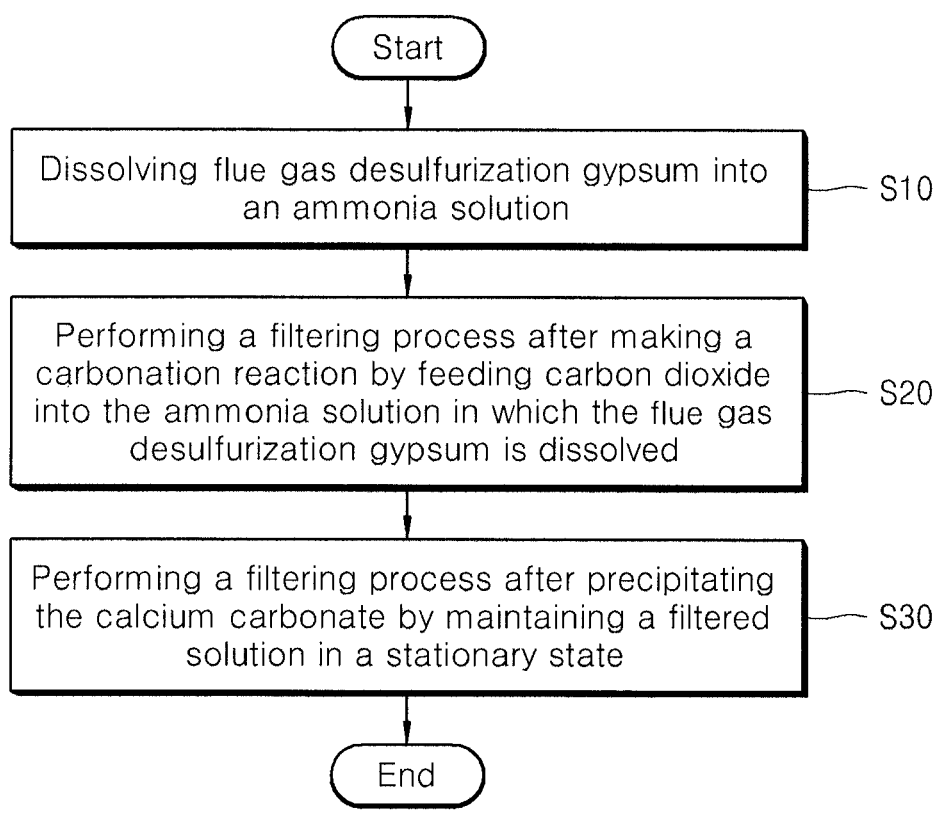
FIG. 1 is a flowchart showing a method of preparing calcium carbonate using a direct carbonation reaction according to the present invention.

FIG. 1 is a flowchart showing the method of preparing the calcium carbonate using the direct carbonation reaction according to the present invention. Hereinafter, the present invention will be described in detail with reference to FIG. 1.

The method of preparing the calcium carbonate using the direct carbonation reaction according to the present invention includes a step of dissolving flue gas desulfurization gypsum into an ammonia solution (step S10).

The flue gas desulfurization gypsum, which is discharged after removing sulfur dioxide ($SO_x$) in a thermoelectric power plant, includes the composition of $CaSO_4 \cdot 2H_2O$, and the discharged flue gas desulfurization gypsum may be prepared as fertilizer.

In addition, preferably, the concentration of ammonia in the ammonia solution is in the range of 4% by volume to 12% by volume. The carbonation reaction may be varied depending on contents in the ammonia solution. As the concentration of the ammonia is increased, the formation efficiency of the calcium carbonate is increased. The formation efficiency of the calcium carbonate may be degraded if the concentration of the ammonia is less than 4% by volume, and the ammonia dissolved in a reacting solution may be volatilized if the concentration of the ammonia exceeds 12% by volume, which is undesirable.

In this case, a solid dosage (S/L) of the flue gas desulfurization gypsum to the ammonia solution is preferably in the range of 5 g/L to 20 g/L. If the solid dosage (S/L) of the flue gas desulfurization gypsum to the ammonia solution is less than 5 g/L, a small amount of calcium carbonate is prepared, which makes difficulty in recovering the calcium carbonate. If the solid dosage (S/L) of the flue gas desulfurization gypsum to the ammonia solution exceeds 20 g/L, the formation efficiency of the calcium carbonate may be degraded to 60% or less. The concentration of the flue gas desulfurization gypsum is in the range of 30 mM to 110 mM based on the solid dosage (S/L).

The flue gas desulfurization gypsum is dissolved in the ammonia solution through an agitating process at an agitating rate of 350 rpm to 450 rpm for 5 min. In detail, the agitating process may be performed by a mechanical impeller. If the agitating rate is less 350 rpm, the flue gas desulfurization gypsum is not sufficiently dissolved in the ammonia solution, so that the carbonation reaction may be degraded. If the agitating rate exceeds 450 rpm, the flue gas desulfurization gypsum is not dissolved in the ammonia solution any more. Accordingly, the agitating rate of 450 rpm or less is preferable in terms of energy efficiency.

Next, the method of preparing the calcium carbonate using the direct carbonation reaction according to the present invention includes a step of performing filtering after making a carbonation reaction by feeding $CO_2$ into the ammonia solution in which the flue gas desulfurization gypsum is dissolved (step S20).

In the method of preparing the calcium carbonate using the direct carbonation reaction according to the present invention, the direct carbonation reaction is made by using gas-phase $CO_2$, liquid-phase ammonia solution, and solid-phase flue gas desulfurization gypsum. The detailed reaction will be expressed through following chemical formula 2.

$$CaSO_4 \cdot 2H_2O + 2NH_4OH(aq) + CO_2(g) \rightarrow CaCO_3(s) + (NH_4)_2SO_4 + 2H_2O$$ [Chemical Formula 2]

In addition, the $CO_2$ is preferably fed at a flow rate of 1 L/min to 3 L/min. If the $CO_2$ is fed at the flow rate of less than 1 L/min, a reaction rate may be downed, so that carbonation reaction time may be increased. If the $CO_2$ is fed at the flow rate exceeding 3 L/min, the carbonation reaction is rapidly performed, so that a solution allowing the preparation of calcium carbonate having high purity may not be easily separated.

In this case, the carbonation reaction is preferably performed for 5 min to 20 min. If the carbonation reaction is performed for less than 5 min, liquid-phase calcium carbonate exists in small amount so that the calcium carbonate may represent a low recovery rate. If the carbonation reaction is performed for more than 20 min, the calcium carbonate may contain impurities.

The carbonation reaction may be performed at a normal temperature and a normal pressure, so that the carbonate reactivity of the flue gas desulfurization gypsum is increased, thereby simply preparing the calcium carbonate, and reducing the preparation cost.

In addition, the carbonation reaction may be completed at the pH 7. Although an initial pH is 12 after the flue gas desulfurization gypsum has been dissolved in the ammonia solution, if the $CO_2$ is fed, and the carbonation reaction is performed, the pH is gradually lowered, so that the carbonation reaction is completed at the pH 7.

If the carbonation reaction is completed, a process of filtering the solution may be performed, and the filtering process may be performed using a 0.2 μm membrane filter. The membrane filter may include cellulose acetate.

The method of preparing the calcium carbonate using the direct carbonation reaction according to the present invention includes a step of performing filtering after precipitating the calcium carbonate by maintaining the filtered solution in a stationary state (step S30).

The filtered solution must be subject to a step of maintaining the solution in the stationary state in order to obtain solid-phase calcium carbonate since the filtered solution exists as the liquid-phase calcium carbonate, and calcium carbonate having high purity obtained by filtering the precipitated calcium carbonate may be cleaned using deionized water and may be dried at the temperature of 60° C.

The method of preparing the calcium carbonate using the direct carbonation reaction according to the present invention may further include a step of crystallizing the filtered solution after precipitating the calcium carbonate. If the filtered solution is crystallized after the calcium carbonate is precipitated, an ammonium sulfate may be prepared. The crystallization may be performed through a dehydration process or a drying process.

Through the method of preparing the calcium carbonate using the direct carbonation reaction according to the present invention, only crystals having calite and vaterite forms are precipitated among anhydrous crystalline forms of calcite, aragonite, and vaterite representing a typical calcium carbonate crystalline form, and an aragonite phase is not formed. In detail, in the method of preparing the calcium carbonate using the direct carbonation reaction according to the present invention, calcium carbonate having a calcite crystal form may be prepared using 5% by weight of the flue gas desulfurization gypsum dissolved in an ammonia solution by maintaining the filter solution in the stationary state. In this case, the calcite has a rhombus form.

In addition, the method of preparing the calcium carbonate using the direct carbonation reaction according to the present invention may further include a step of adjusting the pH of the ammonia solution in which the flue gas desulfurization gypsum is dissolved to 9.0 or more in the carbonation reaction.

According to the preparing method of the present invention, the pH of the ammonia solution in which the flue gas desulfurization gypsum is dissolved is adjusted to 9.0 or more in the carbonation reaction, so that calcium carbonate having a spherical porous vaterite crystal representing the whiteness of 100% can be prepared. In this case, $NH_3$ or $NH_4OH$ may be added in order to adjust pH. The filtering step is performed after the carbonation reaction is performed with $CO_2$, so that the filtered solution is changed to a gel-state, and the calcium carbonate having the vaterite crystal is precipitated after several minutes are elapsed. The calcium carbonate may be directly recovered without a cleaning process using distilled water or ethanol. According to the present invention, if the pH of the slurry is adjusted to 9.0 or more using an ammonia solution, the calcium carbonate having the vaterite crystal is predominantly prepared.

According to the method of preparing the calcium carbonate using the direct carbonation reaction according to the present invention, pH, the $CO_2$ flow rate, the concentration of ammonia, and the solid dosage of the flue gas desulfurization gypsum are adjusted, thereby preventing calcium carbonate from being precipitated together with impurities. In other words, since an ion pair of $Ca^{2+}$ and $CO_3^{2-}$ is dissolved in a solution (dissolved calcium carbonate, DCC), the ions may exist in the solution with the maximum concentration. Accordingly, the vaterite representing the whiteness of 100% can be prepared.

In addition, the present invention provides a method of determining a formation efficiency of calcium carbonate, which includes the steps of preparing slurry after the flue gas desulfurization gypsum is mixed with ammonia solution, filtering after performing a carbonation reaction by feeding $CO_2$ to the slurry, and filtering after precipitating the calcium carbonate in the filtered solution.

The formation efficiency of the calcium carbonate through the carbonation reaction is determined by following equation 1 or 2.

$$\text{Formation efficiency} = \frac{(M_{Ca\text{-}f} - M_{Ca\text{-}f})}{T_{Ca\text{-}s}} \times 100 \quad \text{[Equation 1]}$$

$$\text{Formation efficiency} = \frac{(M_{Ca\text{-}f} - M_{Ca\text{-}f})}{T_{SO_4\text{-}g}} \times 100 \quad \text{[Equation 2]}$$

In the above equations, $M_{Ca\text{-}f}$ represents total concentration of calcium (Ca) in the filtered solution after the carbonation reaction, $M_{Ca\text{-}f}$ represents the concentration of Ca in the solution after the calcium carbonate is precipitated, $T_{Ca\text{-}g}$ represents the total concentration of Ca of the flue gas desulfurization gypsum, and $T_{SO_4\text{-}g}$ represents the total concentration of $SO_4$ of the flue gas desulfurization gypsum.

In the method of determining the formation efficiency of the calcium carbonate through the carbonation reaction according to the present invention, if the pH of the flue gas desulfurization gypsum is adjusted to 9.0 or more by using ammonia solution, the calcium carbonate having the vaterite form may be predominantly prepared, and about 90% of calcium carbonate having the vaterite form may be prepared.

Figure 2:
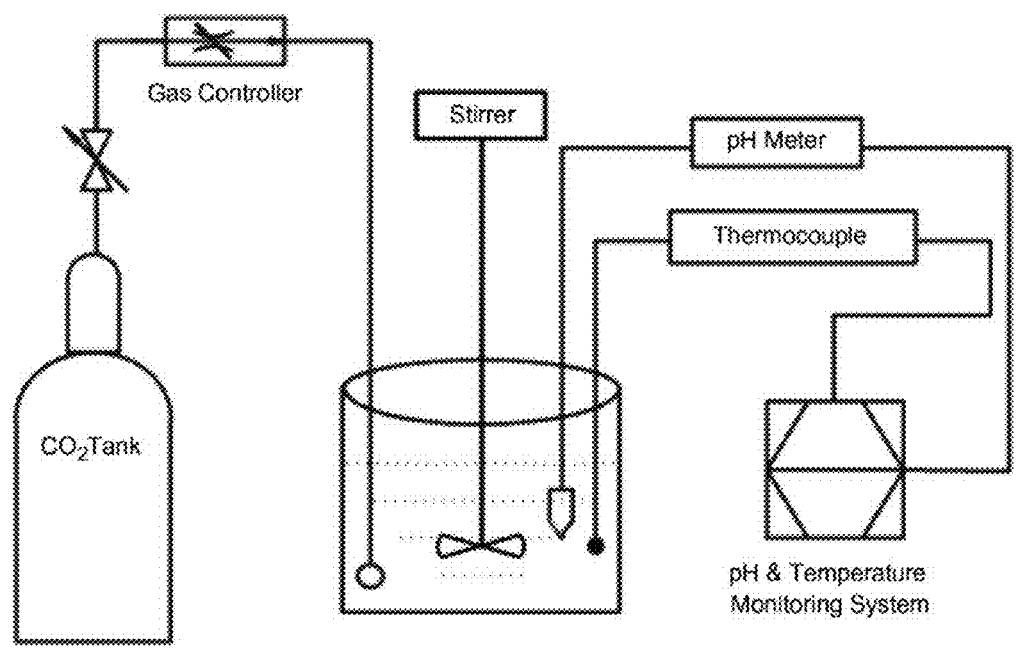
FIG. 2 is a schematic view showing an apparatus for preparing the calcium carbonate using the direct carbonation reaction according to the present invention.

FIG. 2 is a schematic view showing an apparatus for preparing the calcium carbonate using the direct carbonation reaction. Referring to FIG. 2, solid particles of the flue gas desulfurization gypsum are agitated by an impeller and dissolved in the ammonia solution. Then, after $CO_2$ gas is injected to perform the carbonation reaction, the filtered solution is maintained in a stationary state and filtered to obtain the precipitated calcium carbonate. In this case, pH and a temperature may be measured using a pH meter and a thermocouple. The calcium carbonate having high purity, which is obtained through a membrane filter, may be additionally cleaned using deionized water and dried.

Embodiment 1

Preparation of Calcium Carbonate 1

The flue gas desulfurization gypsum was obtained at Yeongheung thermal power plant located in Incheon, Korea and dried at a temperature of 45° C. overnight in order to remove moisture from the surface of the flue gas desulfurization gypsum. The dried flue gas desulfurization gypsum was put into the ammonia solution and agitated at 400 rpm for 5 min. to dissolve the flue gas desulfurization gypsum in the ammonia solution. In this case, 200 g of flue gas desulfurization gypsum and 3.9% (v/v) of ammonia solution were used. An aqueous ammonia solution (25%, density=0.9 g/mL) was used. The solid dosage was 15 g/L. In addition, $CO_2$ (99.99%) was injected into the ammonia solution in which the flue gas desulfurization gypsum is dissolved at the feeding rate of 1 L/min to 3 L/min to make the carbonation reaction. Then, the solution was filtered using a 0.2 μm membrane filter (cellulose acetate). The filtered solution was maintained in a stationary state for 10 hours to precipitate calcium carbonate having high purity. Then, the filtering was performed to obtain solid-phase calcium carbonate. All processes were performed at a normal temperature and normal pressure.

Embodiment 2

Preparation Of Calcium Carbonate 2

The flue gas desulfurization gypsum was obtained at Yeongheung thermal power plant located in Incheon, Korea. The size of the flue gas desulfurization gypsum was in the range of 1 μm to 100 μm, and the average particle size of the flue gas desulfurization gypsum was 32.9 μm. In this case, 80% or more of the flue gas desulfurization gypsum had a size smaller than 74 μm. The purity of the flue gas desulfurization gypsum was in the range of 95% to 98%. The flue gas desulfurization gypsum was put into the ammonia solution and agitated at 400 rpm for 5 min. to dissolve the flue gas desulfurization gypsum in the ammonia solution. In addition, $CO_2$ gas was injected into the ammonia solution, in which the flue gas desulfurization gypsum was dissolved, to make the carbonation reaction. In this case, the pH of the ammonia solution, in which the flue gas desulfurization gypsum is dissolved, was adjusted to 9 and filtered, and the filtered solution was left for a predetermined time to obtain the calcium carbonate having the vaterite form.

Comparative Example 1

Preparation of Calcium Carbonate According to Related Art $CO_2$ was fed to 3.9% (v/v) of an ammonia solution at the flow rate of 1 L/min to prepare ammonium bicarbonate.

Thereafter, the resultant was cooled at a normal temperature, and the prepared ammonium bicarbonate was reacted with the flue gas desulfurization gypsum.

Experimental Example 1

Element Analysis of Flue Gas Desulfurization Gypsum

Figure 3:
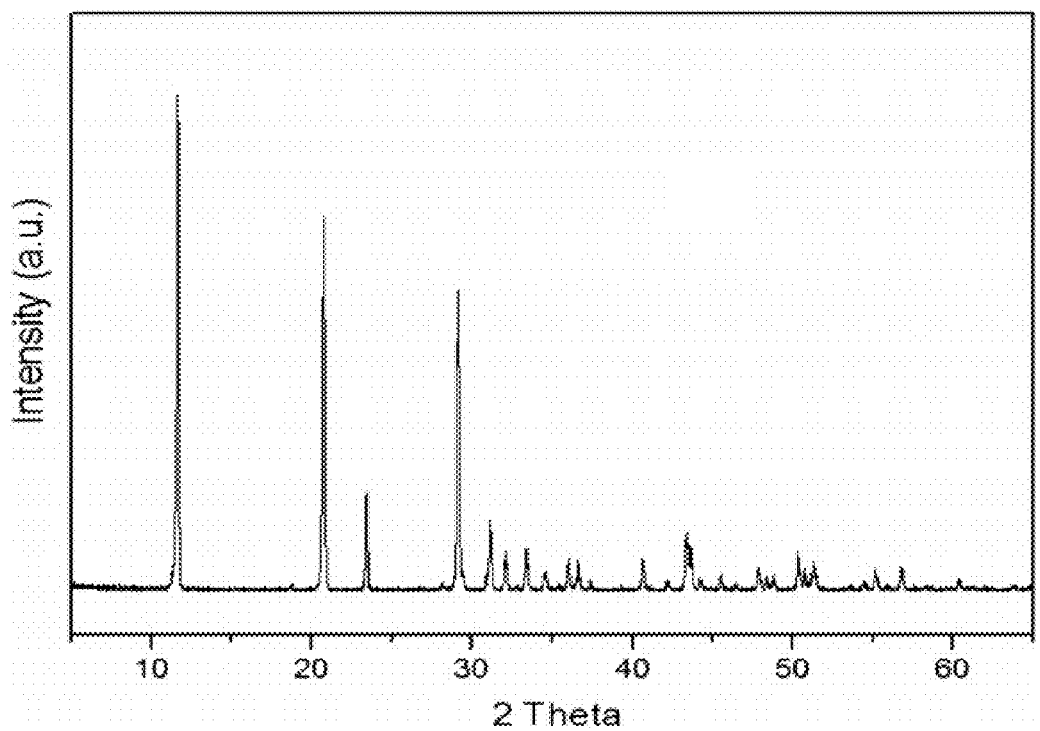
FIG. 3 is a graph showing an XRD analysis result of the flue gas desulfurization gypsum.

The flue gas desulfurization gypsum obtained at Yeongheung thermal power plant located in Incheon, Korea was analyzed by an X-ray diffraction (XRD), and the analysis result shows that the flue gas desulfurization gypsum is calcium sulfate dehydrate having a minor phase and containing muscovite ($KAl_2Si_3AlO_{10}$ $(OH)_2$) and dolomite ($CaMg(CO_3)_2$) (See FIG. 3). The purity of the calcium sulfate dehydrate was about 97.5%, and the calcium sulfate dehydrate contained 0.7% of $SiO_2$, 0.4% of $Al_2O_3$, 0.2% of $Fe_2O_3$ and 0.1% of $K_2O$ as a significantly small amount of impurities, and heavy metal impurities such as Pb, Ag, Hg, Zn, Mn, and Cd were not detected. The calcium sulfate dehydrate had a volume mean diameter of 32.9 μm, and had a particle size in the range of 1 μm to 100 μm. However, most particles, that is, 80% or more of particles had the size of 74 μm or less.

Experimental Example 2

Carbonation of Flue Gas Desulfurization Gypsum

The flue gas desulfurization gypsum makes a carbonation reaction at a normal temperature and normal pressure to prepare ammonium sulfate and calcium carbonate. The calcium carbonate prepared through the carbonation reaction had both of calcite and vaterite crystals. Since most impurities, which were not dissolved, easily were filtered, the ammonium sulfate dissolved in a solution might be prepared with high purity. Metallic impurities, such as Si, K, Na, Al, and Mg, were contained in the filtered solution with the concentration of 10 mg/L or less, and Fe was contained with the concentration of 0.01 mg/L or less. Accordingly, it determined that the metallic impurities were derived from minerals, such as muscovite and dolomite, which were not dissolved. Accordingly, the purity of the prepared ammonium sulfate was 98% or more, which was appropriate to the commercial use of the ammonium sulfate.

Figure 4:
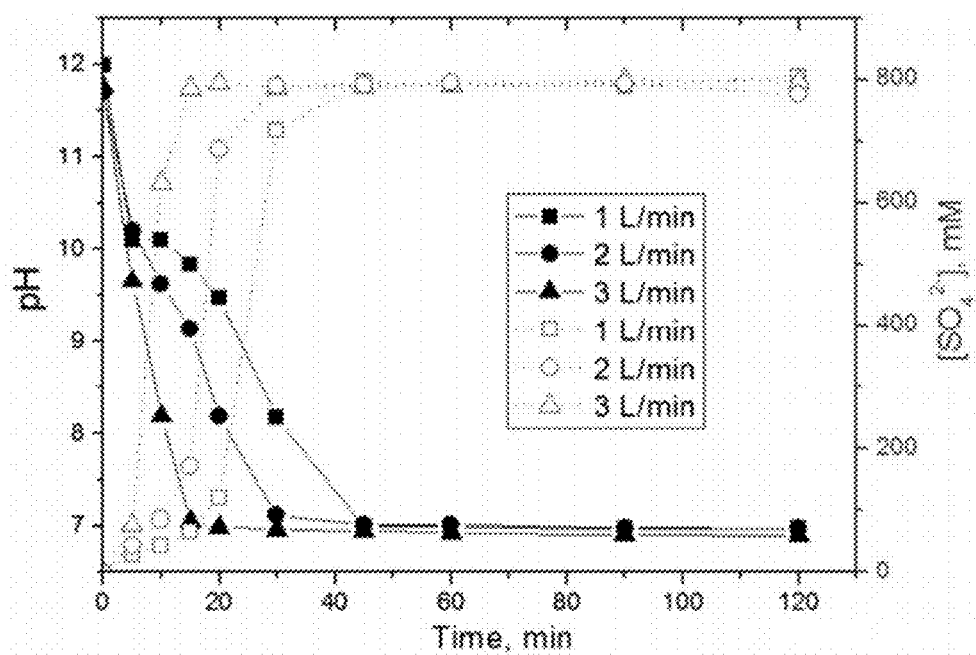
FIG. 4 is a graph showing the concentration of dissolved sulfate ions and the pH according to a carbonation reaction time in the method of preparing the calcium carbonate using the direct carbonation reaction according to the present invention.

FIG. 4 is a graph showing the concentration of dissolved sulfate ions and the pH according to a carbonation reaction time in the method of preparing the calcium carbonate using the direct carbonation reaction according to the present invention (a continuous line of FIG. 4 represents pH variation and a dotted line represents the variation in the concentration of the sulfate ions).

After the flue gas desulfurization gypsum was fed, the initial pH of the ammonia solution was 12. Before $CO_2$ was fed, the concentration of the dissolved calcium and the sulfate ion concentration were 560 mg/L (or 14.0 mM) and 1350 mg/L (or 14.0 mM), respectively. The $CO_2$ gas easily was dissolved to $CO_3^{2-}$ at the initial pH 12. The carbonation reaction was performed by measuring and monitoring the pH of the solution and the sulfate ion concentration. As shown in FIG. 4, if the carbonation reaction is completely performed, the sulfate ion concentration reaches a predetermined value of about 800 mM, and the pH reaches a predetermined value of about 7.0. The dissolution rate of the flue gas desulfurization gypsum was increased according to the feed flow rate of $CO_2$. The increase of the feed flow rate facilitates the feeding of carbonate ions in a solution reacting with calcium ions to enhance the carbonation reaction. In addition, the agitation is improved due to the increased feed flow rate of $CO_2$ to increase the dissolution of the flue gas desulfurization gypsum.

Figure 5:
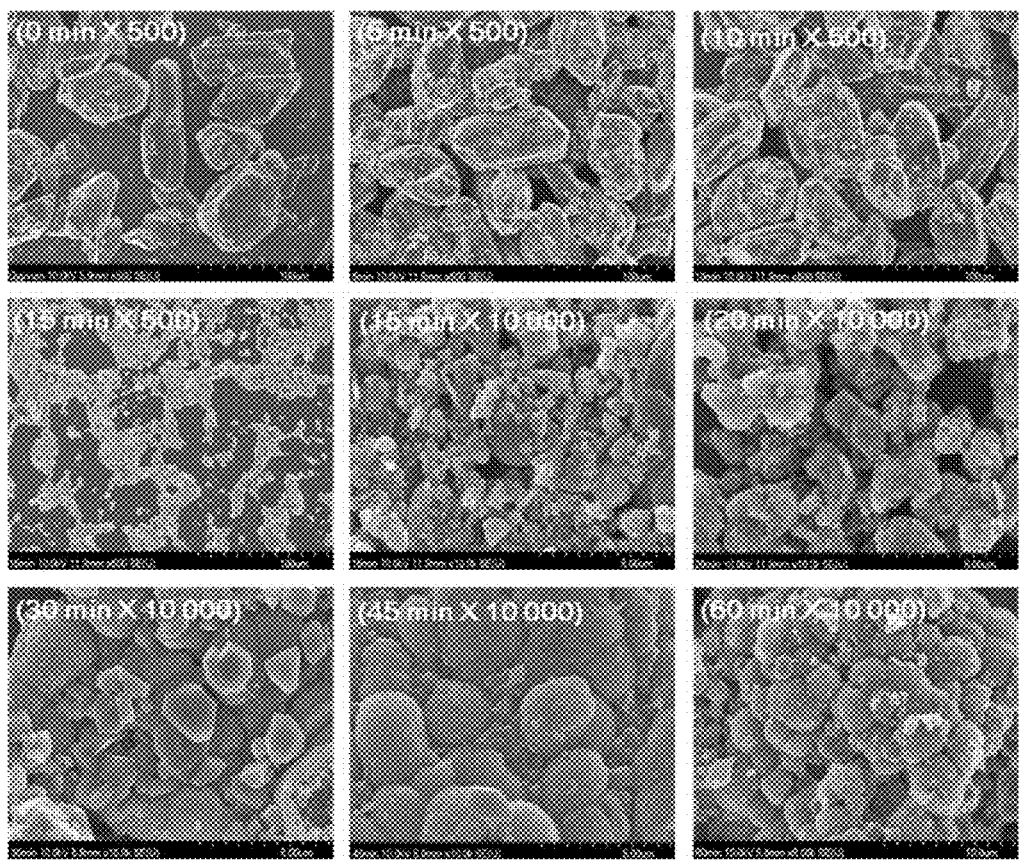
FIG. 5 illustrates FE-SEM photographs of solid residues prepared during the carbonation reaction in the method of preparing the calcium carbonate using the direct carbonation reaction according to the present invention.
Figure 6A:
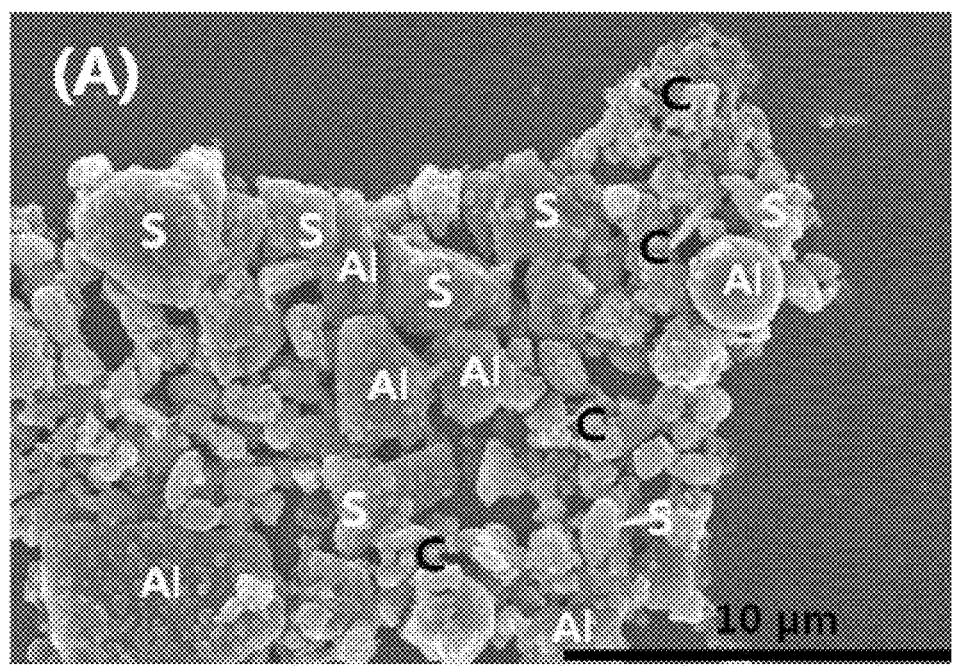
FIG. 6(A) illustrates an SEM photograph (×10000), FIG. 6 (B) illustrates an EDS mapping result (C—$K_a$), FIG. 6 (C) illustrates an EDS mapping result (Al—$K_a$), and FIG. 6 (D) illustrates an EDS mapping result (S—$K_a$) after the direction carbonation reaction for 15 min.
Figure 6B:
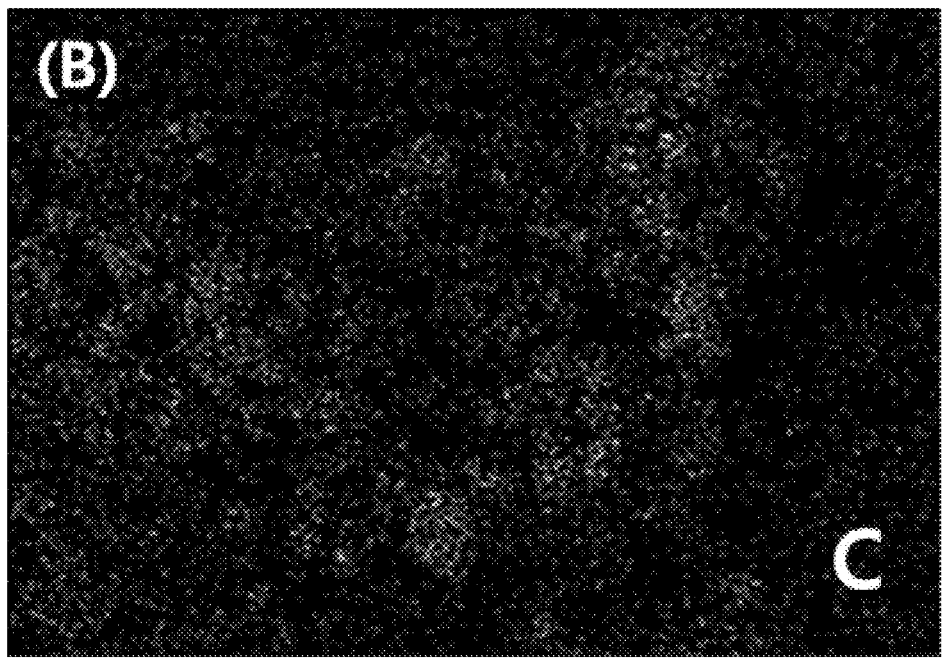
Figure 6C:
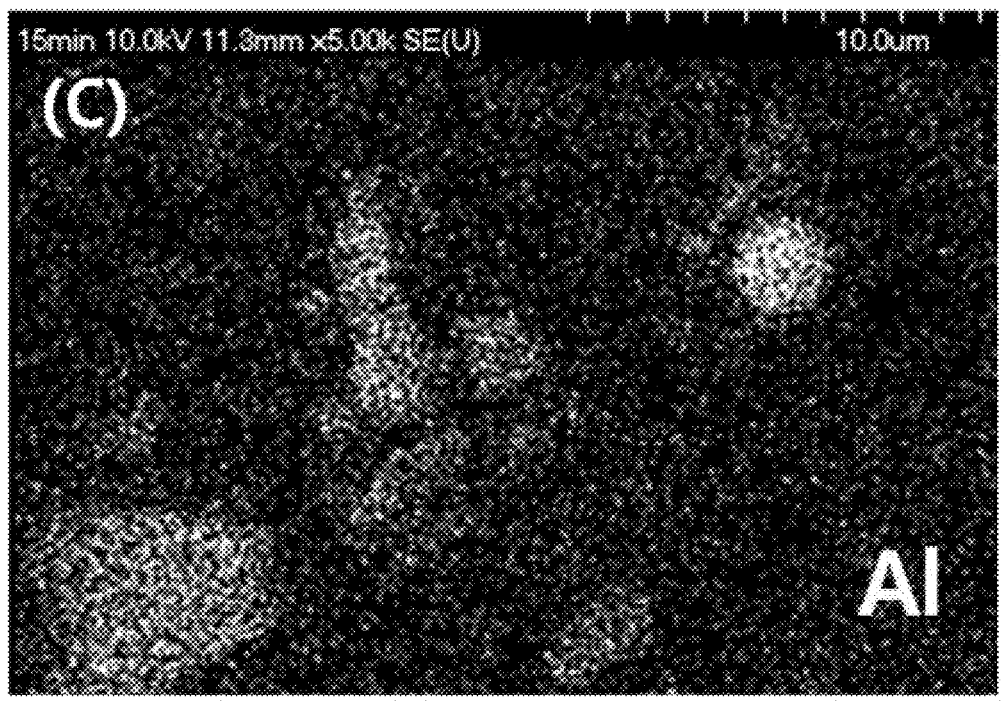
Figure 6D:
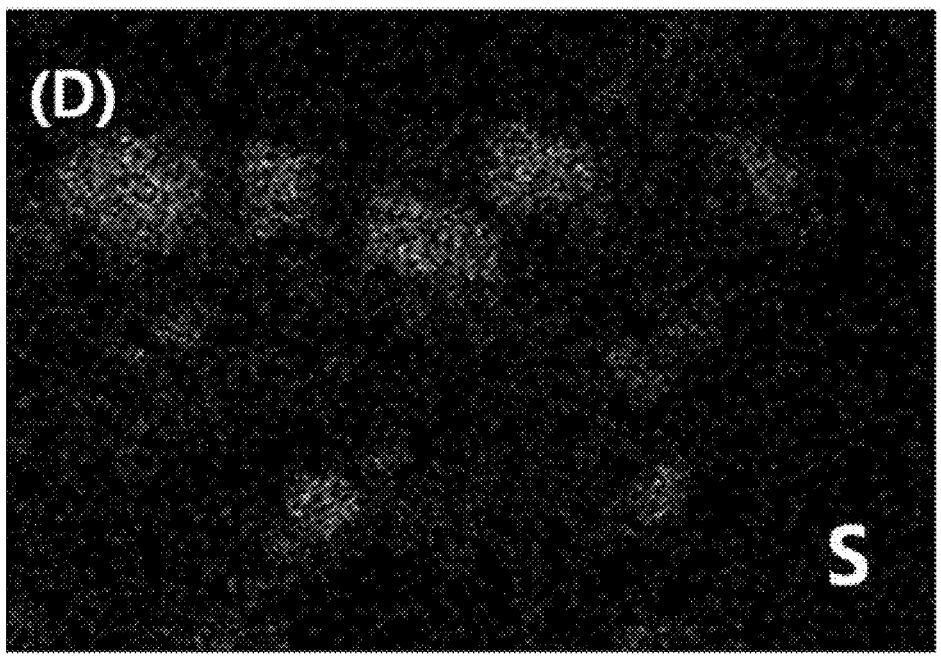

FIG. 5 illustrates a field emission scanning electron microscope (FE-SEM) photography of solid residues filtered during the carbonation reaction, which shows that the form of a reaction product is changed as a time is elapsed. As shown in a low magnification (×500) microscope photography, the size of the flue gas desulfurization gypsum was rapidly reduced between 10 min. to 15 min. According to the low magnification (×1000) microscope photography, calcium carbonate precipitates were separated from desulfurization gypsum and formed, and the carbonation reaction was made through the separation of the flue gas desulfurization gypsum particles. As shown in the high magnification (×10000) microscope photography, the calcium carbonate precipitates were separated from desulfurization gypsum, and not formed on the surface of the flue gas desulfurization gypsum. The result can be recognized from an EDX mapping result of the solid residues after the carbonation reaction during 15 min in the method of preparing the calcium carbonate using the direct carbonation reaction according to the present invention shown in FIG. 6. FIG. 6(A) illustrates an SEM photograph (×10000), FIG. 6(B) illustrates an EDS mapping result (C—$K_a$), FIG. 6 (C) illustrates an EDS mapping result (Al—$K_a$), and FIG. 6 (D) illustrates an EDS mapping result (S—$K_a$) after the direction carbonation reaction for 15 min. As shown in the photographs of C—$K_a$ ($CaCO_3$) and S—$K_a$ ($CaSO_4$), the calcium carbonate was not prepared on the surface of the flue gas desulfurization gypsum.

Experimental Example 3

Form Analysis of Calcium Carbonate

Figure 7:
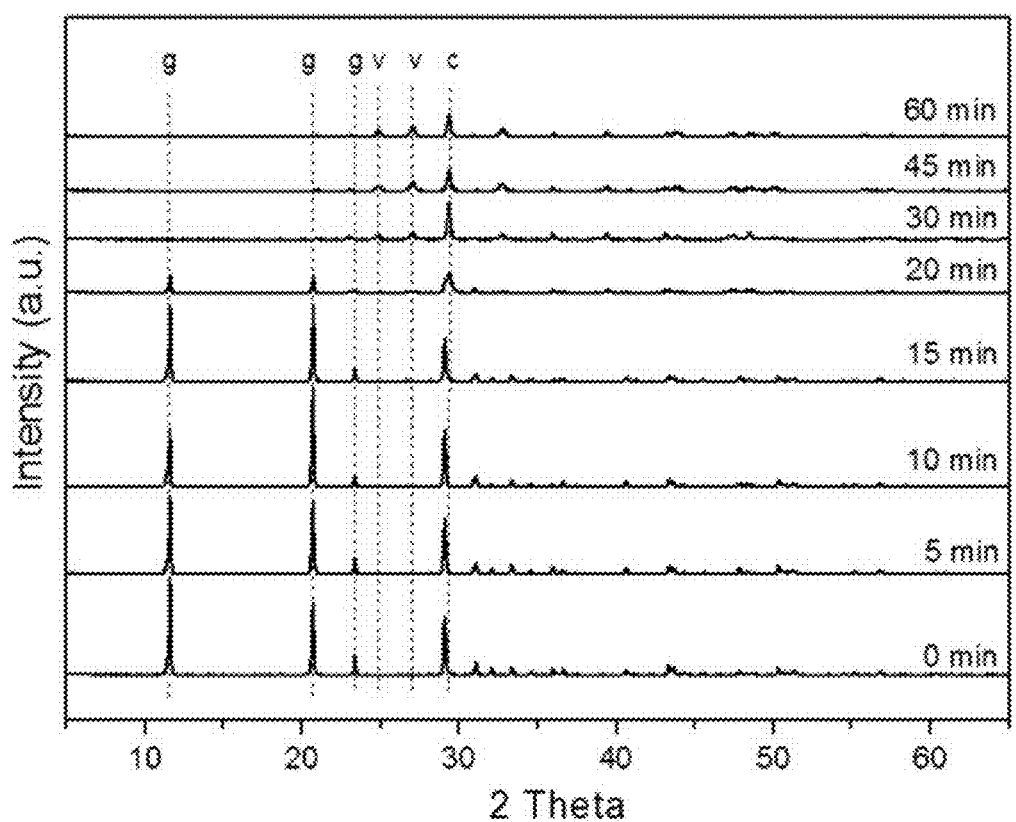
FIG. 7 is a graph showing an XRD graph of solid residues according to the carbonation reaction time in the method of preparing the calcium carbonate using the direct carbonation reaction according to the present invention.
Figure 8:
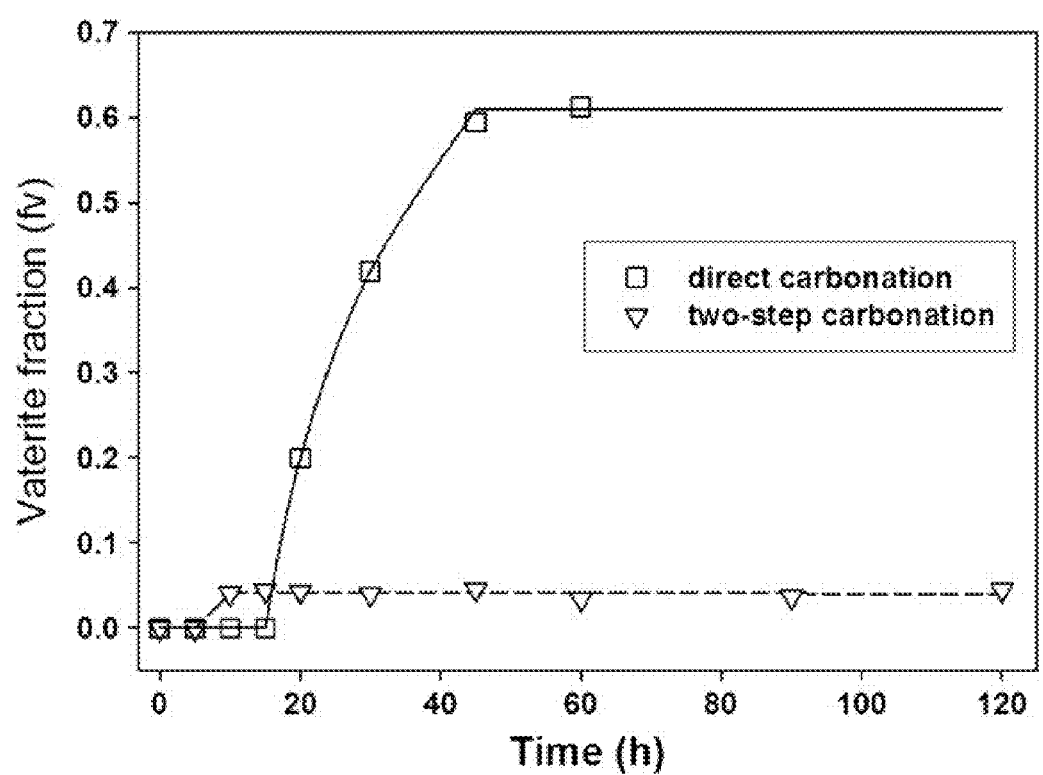
FIG. 8 is a graph showing the content variation of a vaterite phase according to the carbonation reaction time in the method of preparing the calcium carbonate using the direct carbonation reaction according to the present invention.

Vaterite among three forms of the calcium carbonate is most unstable thermodynamically. The form of the calcium carbonate according to the present invention depends on a carbonation reaction sequence and a carbonation reaction time. The phase variation was analyzed according to the carbonation reaction time under the condition of the $CO_2$ feed flow rate of 1 L/min. FIG. 7 is a graph showing an XRD graph of solid residues according to the carbonation reaction time in the method of preparing the calcium carbonate using the direct carbonation reaction according to the present invention. The calcium carbonate was not shown in the XRD result at the carbonation reaction time of less than 15 mn. FIG. 8 is a graph showing the content variation of a vaterite phase according to the carbonation reaction time in the method of preparing the calcium carbonate using the direct carbonation reaction according to the present invention. In the direct carbonation reaction, the vaterite phase was increased as a time was elapsed, which was recognized from the FE-SEM of FIG. 5. As shown in FIG. 8, the variation of the vaterite phase was stopped after 45 min from when the vaterite phase was rapidly increased. The lack of calcium ions leads the production of calcite that is thermodynamically stable. Accordingly, $CO_2$ partial pressure exerts an influence on crystallization. If calcium ions have the high concentration of 80 mM or more, the vaterite is formed at the $CO_2$ partial pressure. If the $CO_2$ flow rate is increased, the content of the vaterite is increased. This is because $CO_3^{2-}$ has high concentration. As shown in FIG. 4, although sulfate ions had lower concentration (120 mM corresponding to 15% of the total concentration) at 20 min., the concentration of the sulfate ions rapidly was increased to 89% of the total concentration of 720 mM). The concentration of the dissolved sulfate ions is varied corresponding to an amount of dissolved calcium ions. Accordingly, if the calcium ions are insufficiently dissolved, a larger amount of calcite phase, which are thermodynamically stable, was precipitated through slow nucleus production and growth during an initial step. Meanwhile, if the reaction time is 30 min., the sulfate ions corresponding to 89% of the total amount were dissolved. Accordingly, calcium ions were sufficiently provided after 20 min., and the vaterite phase was increasingly precipitated.

Experimental Example 4

Formation Analysis of Calcium Carbonate According to Induction Time

The calcium carbonates exist in the form of ion pairs during an induction time (carbonation reaction time) before the calcium carbonates are precipitated. In general, the induction time is observed if the precipitation process is slowly performed. In other words, the concentration ratio of calcium to the carbonate ion represents a small value in a stoichiometric aspect.

Figure 9:
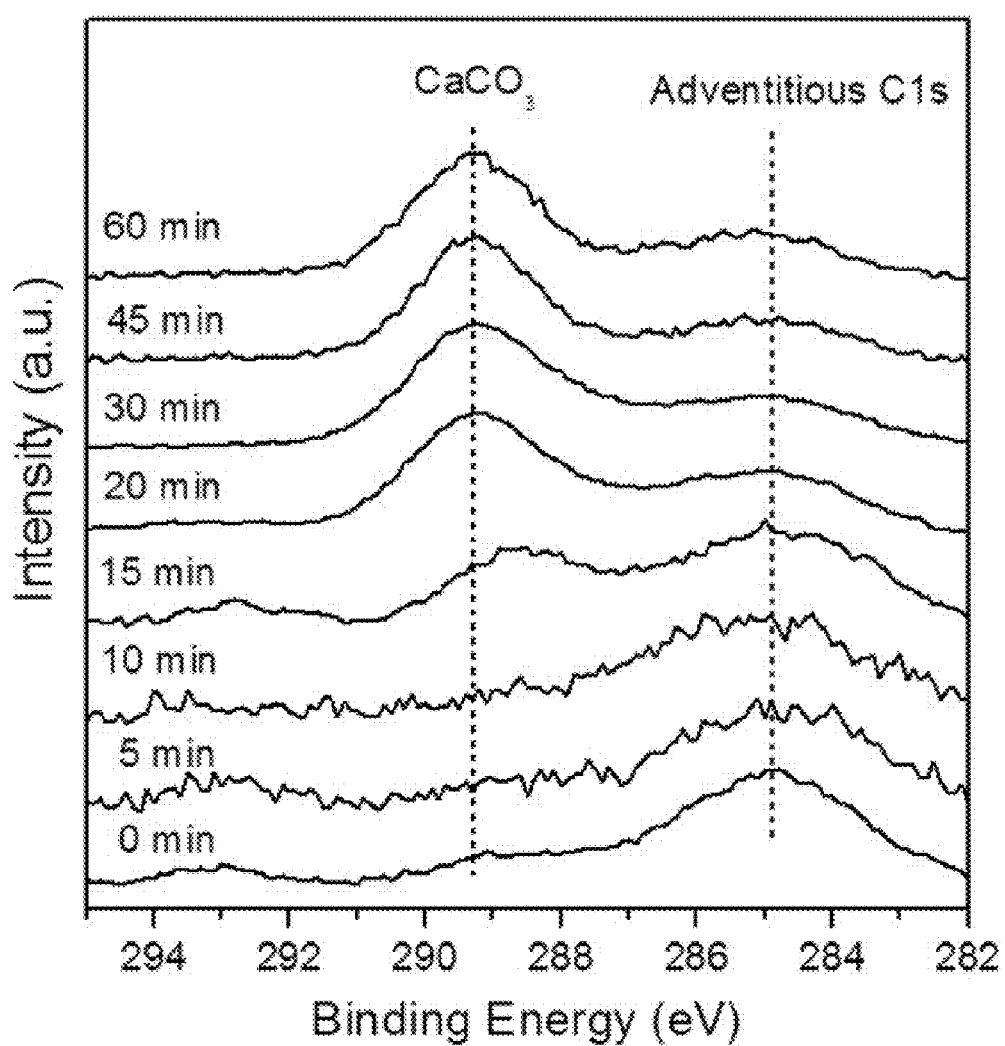
FIG. 9 is a graph showing an XPS Cls spectrum result of a solid residue according to the carbonation reaction time in the method of preparing the calcium carbonate using the direct carbonation reaction according to the present invention.

FIG. 9 is a graph showing an XPS C1s spectrum result of a solid residue produced according to the carbonation reaction time in the method of preparing the calcium carbonate using the direct carbonation reaction according to the present invention. The intensity of a C1s peak of $CaCO_3$ is increased as the carbonation reaction is progressed. The carbonation reaction was clearly made after 20 min. The binding energy of C1s represents a small value at a 15-min sample. This is because the crystal growth is not completed, which is matched with the XRD result shown in FIG. 7.

Figure 10:
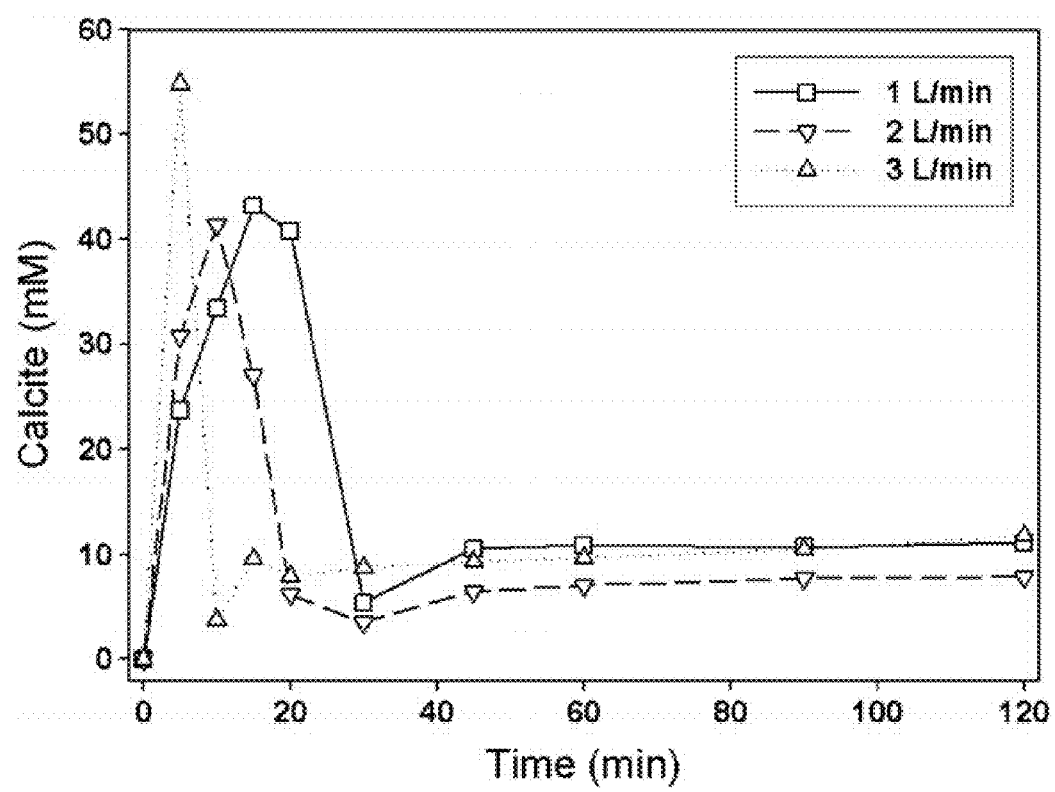
FIG. 10 is a graph showing the variation of calcite concentration of calcium carbonate precipitated in the filtered solution according to the carbonation reaction time in the method of preparing the calcium carbonate using the direct carbonation reaction according to the present invention.

FIG. 10 is a graph showing the variation of calcite concentration of the prepared calcium carbonate precipitated according to the carbonation reaction time in the method of preparing the calcium carbonate using the direct carbonation reaction according to the present invention. As shown in FIG. 10, as the $CO_2$ gas flow rate is increased, the induction time is shortened. This is because the rapid chemical adsorption of the $CO_2$ gas not only dissolves the flue gas desulfurization gypsum but also accelerates the precipitation of the calcium carbonate. To the contrary, in the case of the two-step reactions according to the related art, since a sufficient amount of calcium ions and bicarbonate ions exist for calcium carbonate precipitation even after the reaction time of 5 min., the existence or the checking of the induction time is impossible in the two-step calcium carbonate preparation. Due to the difference, the direction carbonation reaction according to the present invention allows the precipitation of the calcium carbonate having the high purity from the solution for the induction period (a carbonation reaction time).

Experimental Example 5

Precipitation of Calcite Having High-Purity

A calcium carbonate crystal may be precipitated according to a reaction time in the direct calcium carbonate. Most impurities contained in the flue gas desulfurization gypsum are not dissolved, but removed in the filtration process, so that the impurities do not exist in a solution. Therefore, pure calcium carbonate may be prepared from the filtered solution for the induction time.

Figure 11A:
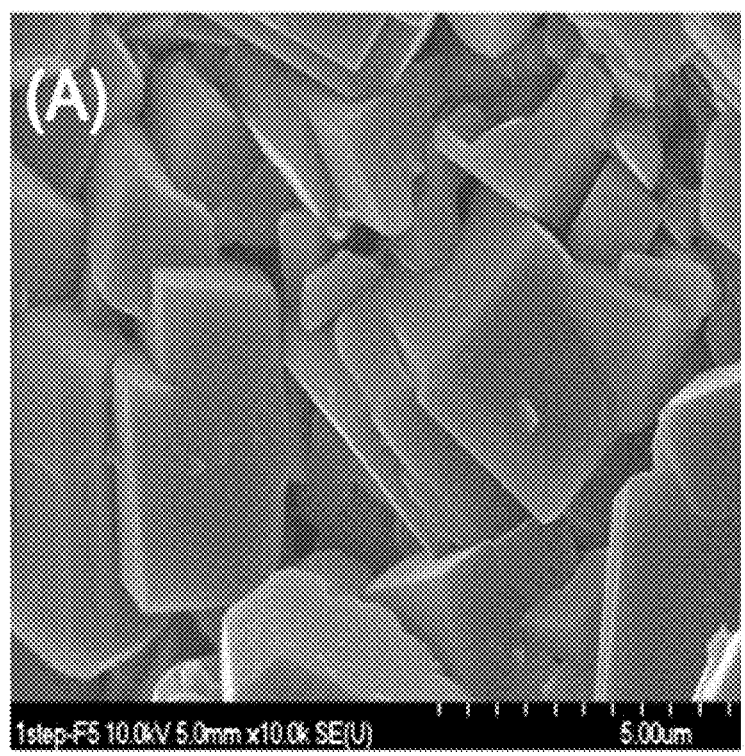
FIGS. 11(A), 11(B), and 11(C) are FE-SEM photographs of calcites precipitated in the filtered solution after the carbonation reactions for 5 min, 15 min. and 20 min. respectively.
Figure 11B:
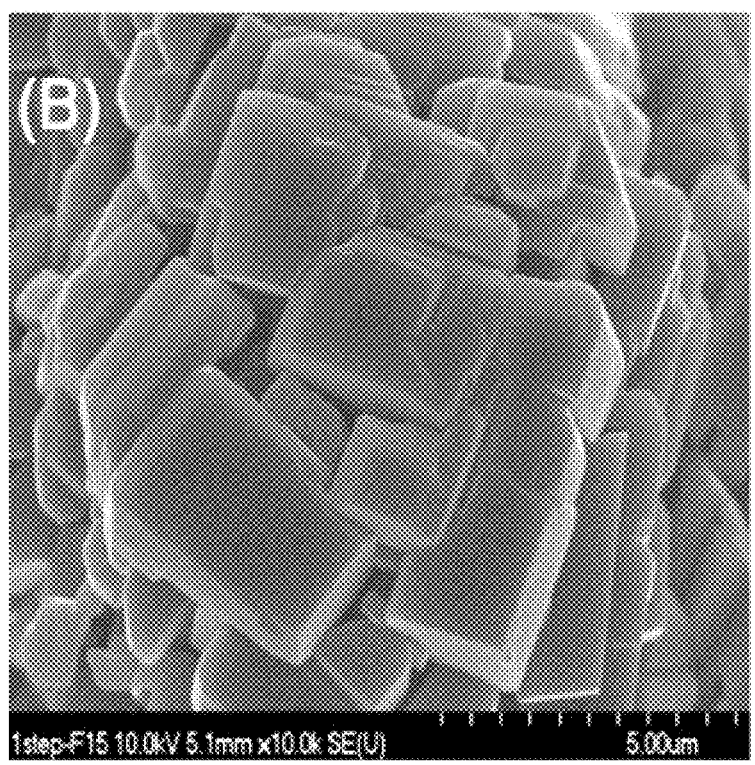
Figure 11C:
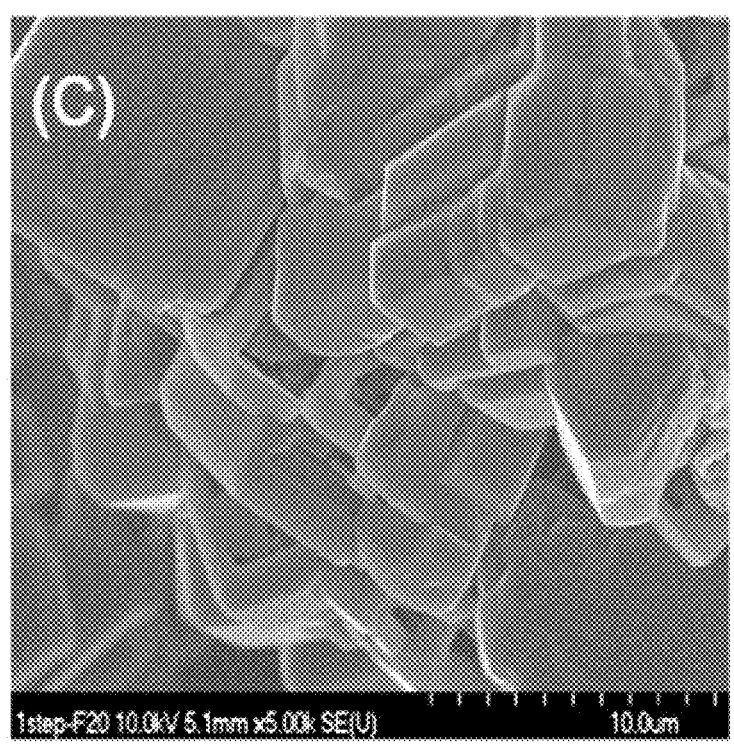

In order to verify the above description, after maintaining a solution in a stationary state for about 10 hours, solid precipitates were filtered and recovered. The precipitates are determined as being single calcite crystals based on FE-SEM and XRD analyses. FIG. 11 illustrates an FE-SEM photograph calcium carbonate precipitated in the filtered solution after the carbonation reaction in the method of preparing the calcium carbonate using the direct carbonation reaction according to the present invention. FIGS. 11(A), 11(B), and 11(C) are FE-SEM photographs of calcites precipitated in the filtered solution after the carbonation reactions for 5 min, 15 min. and 20 min. respectively.

The calcite crystal has the size of several μm and high purity, and most impurities was detected below detection limit. An amount of the calcite crystals having high purity obtained through the direct carbonation reaction according to the present invention was about 5 weight % of the flue gas desulfurization gypsum. In order to increase the yield rate of the calcium carbonate and prepare the calcium carbonate having high purity, the crystallization rate of the calcium carbonate must be delayed and the induction time must be increased.

Experimental Example 6

Analysis of Components and Forms of Calcium Carbonate

Figure 12:
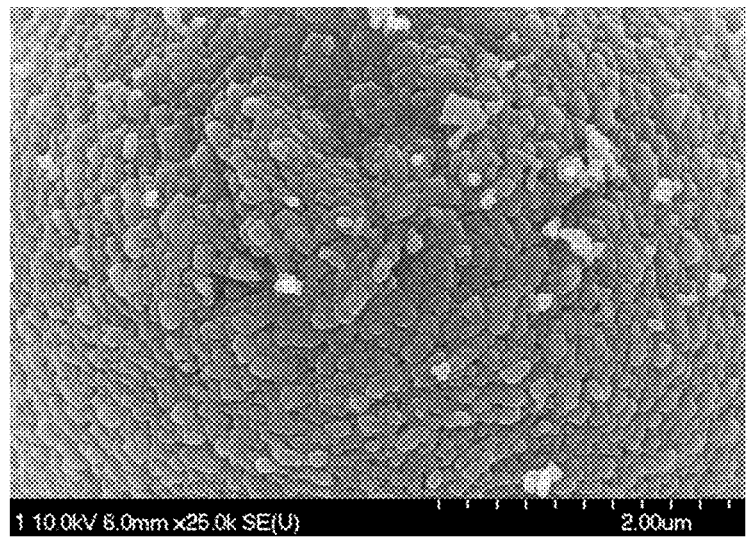
FIGS. 12 (a) and (b) illustrate SEM photographs of calcium carbonate prepared by adjusting pH to at least 9 in the preparation method.
Figure 12:
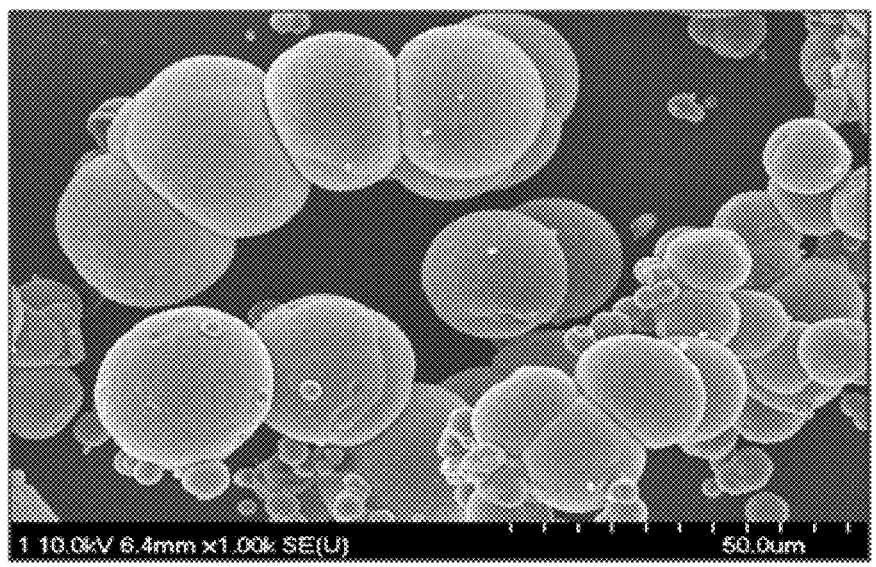
Figure 13:
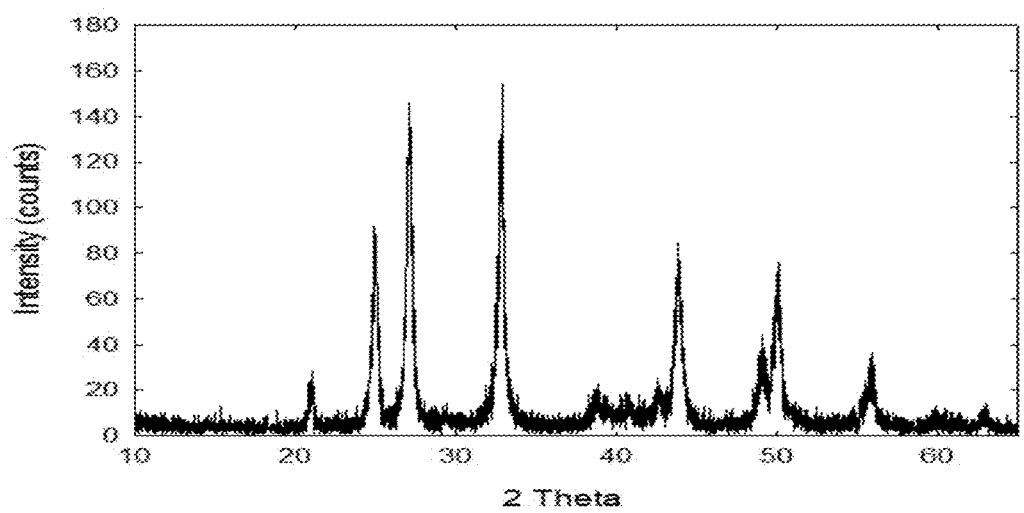
FIG. 13 is a graph showing an XRD analysis result of calcium carbonate prepared by adjusting pH to at least 9 in the preparation method according to the present invention.

In order to analyze the forms and the components of the calcium carbonate prepared in the preparation method according to the present invention, SEM analysis and XRD was performed, and the analysis results were shown in FIG. 12 (FIG. 12(b) is an enlarged view of FIG. 12(a)) and FIG. 13.

A filtering process was performed after the carbonation reaction of the flue gas desulfurization gypsum, and the filtered solution was changed to a gel-phase solution. After several minutes, crystalline calcium carbonate was prepared.

Referring to FIGS. 12 and 13, spherical calcium carbonate particles were prepared. When pH was adjusted to 9.0 or more using $NH_3$ or $NH_4OH$, vaterite-formed particles were mainly prepared.

Experimental Example 7

Formation Efficiency Analysis of Calcium Carbonate According to CO2 Flow Rate

Figure 14:
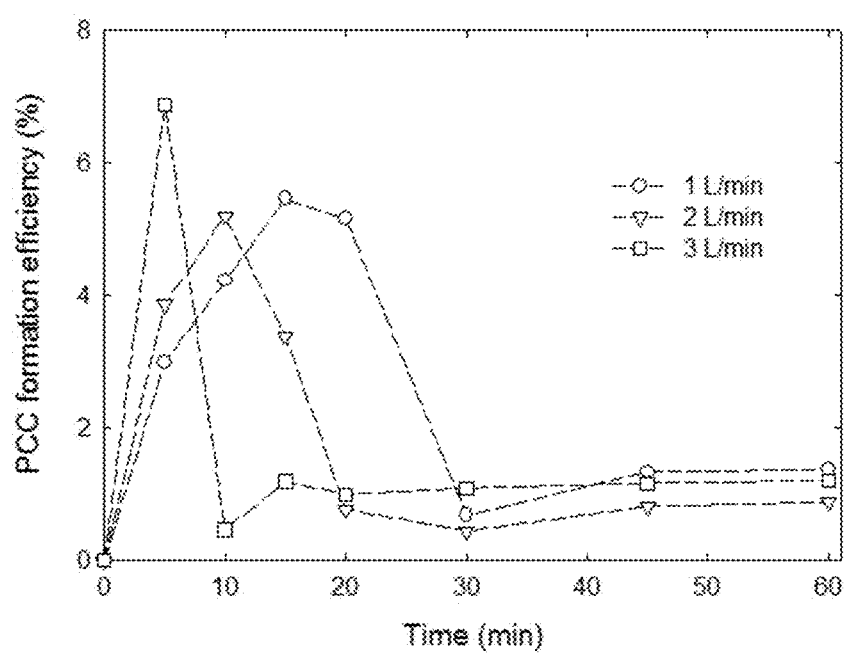
FIG. 14 is a graph showing a formation efficiency of calcium carbonate according to a $CO_2$ flow rate in the preparation method according to the present invention.

In the preparation method of the present invention, the formation efficiency of calcium carbonate according to a $CO_2$ flow rate was analyzed while changing the CO2 flow rate to 1 L/min, 2 L/min, or 3 L/min, and the analysis result was shown in FIG. 14. The solid dosage of the desulfurization gypsum was 150 g/L, and an ammonia content was 4.0% by volume.

As shown in FIG. 14, as the $CO_2$ flow rate was increased, the calcium carbonate rapidly was formed. When the $CO_2$ flow rate is 1 L/min, 2 L/min or 3 L/min, the maximum formation efficiency of the calcium carbonate was represented at 15 min, 10 min, or 5 min, respectively. Accordingly, if the $CO_2$ flow rate is increased, $CO_2$ is rapidly fed to the ammonia solution to increase the formation of carbonate ions reacting with the desulfurization gypsum. In addition, not only the carbonation reaction, but also the precipitation of $CaCO_3$ is accelerated. The $CO_2$ flow rates of 1 L/min, 2 L/min, or 3 L/min represented the maximum formation efficiency of calcium carbonate of 5%, 5%, or 7%, respectively.

Experimental Example 8

Formation Analysis of Calcium Carbonate According to pH Variation

Figure 15:
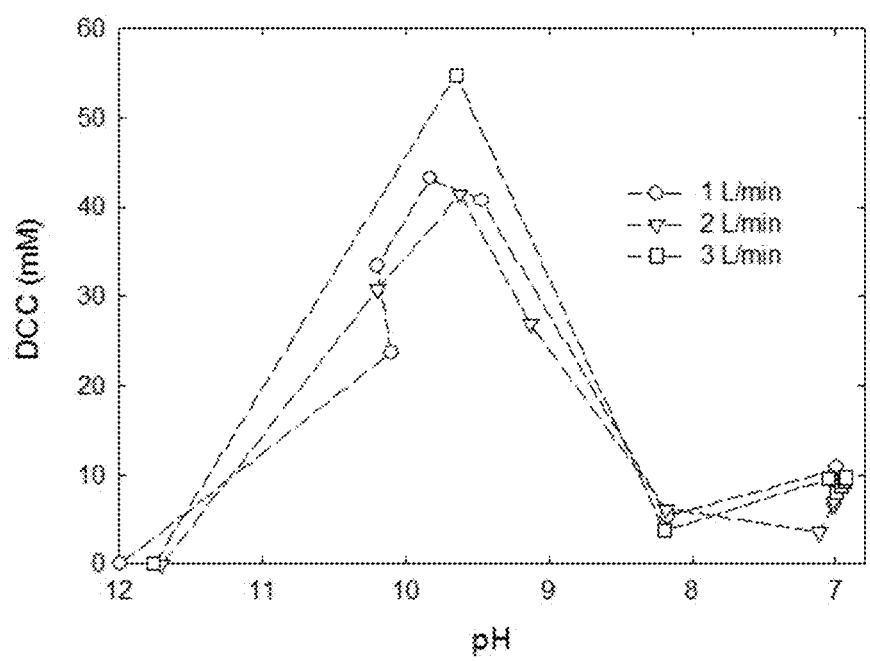
FIG. 15 is a graph showing the variation of DCC concentration according to pH variation in the preparation method according to the present invention.

The variation of DCC concentration according to pH variation was recognized in the preparation method of the present invention, and the analysis result was shown in FIG. 15.

According to the preparation method of the present invention, the termination time point of the calcium carbonate may be determined by monitoring the pH variation. The initial pH is about 12 due to the ammonia solution. If the carbonation reaction is terminated, pH reached about 7.

As shown in FIG. 15, the maximum concentration of DCC is pH 9.5.

Experimental Example 9

Formation Analysis of Calcium Carbonate According to Ammonia Content

Figure 16:
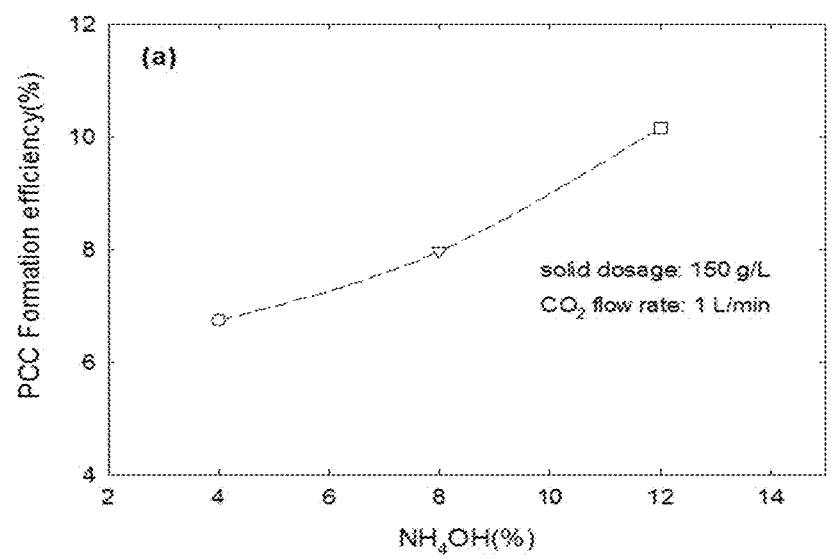
FIG. 16 (a) illustrates graphs showing calcium carbonate formation efficiency according to ammonia content in the preparation method according to the present invention.
Figure 16:
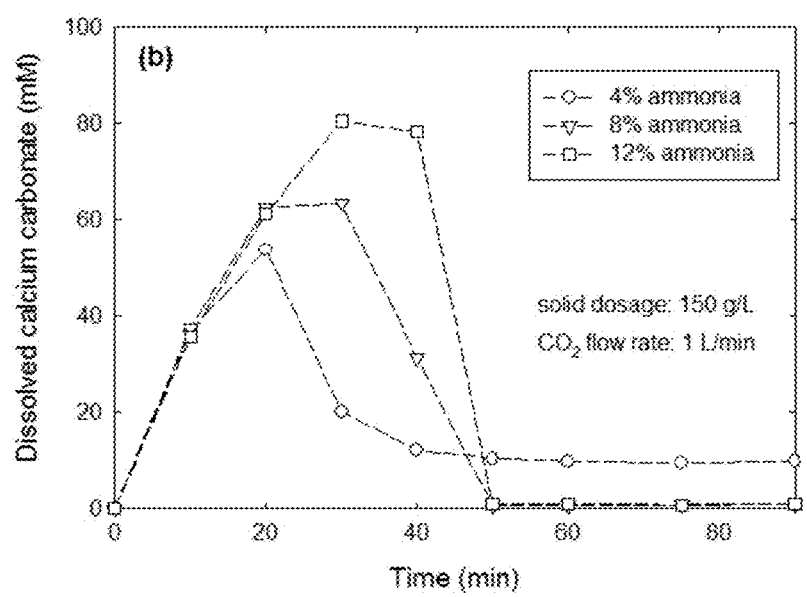

The formation of calcium carbonate was analyzed according to an ammonia content in the preparation method of the present invention, and the analysis result was shown in FIG. 16.

As shown in FIG. 16, if an initial ammonia concentration was high, pH was gradually reduced. The influence of the addition of $CO_2$ exerted on the formation of ammonium was reduced. Under the condition that the solid dosage of the desulfurization gypsum was 150 g/L and the $CO_2$ flow rate was 1 L/min, the ammonia concentration was changed to 4% by volume (1.3 mol $NH_3$), 8% by volume (2.7 mol $NH_3$) and 12% by volume (4.0 mol $NH_3$). The maximum formation efficiency of calcium carbonate according to the ammonia content was increased (see FIG. 16 (a)). In addition, as the ammonia concentration was increased, the ion pairs of $Ca^{2+}$ and $CO_3^{2-}$ was dissolved in a solution for a long time (see FIG. 16 (b)).

Experimental Example 10

Figure 17:
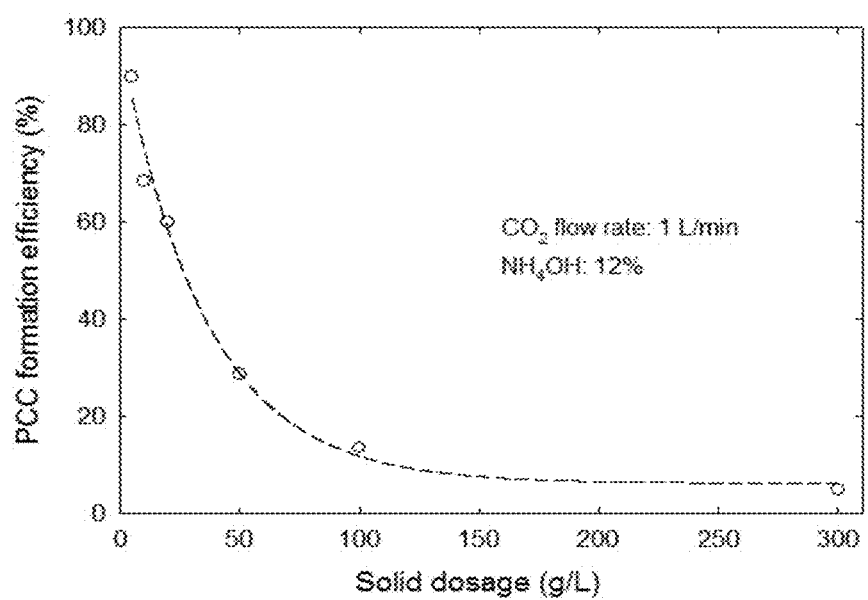
FIG. 17 is a graph showing calcium carbonate formation efficiency according to a solid dosage of desulfurization gypsum in the preparation method according to the present invention.
Figure 18:
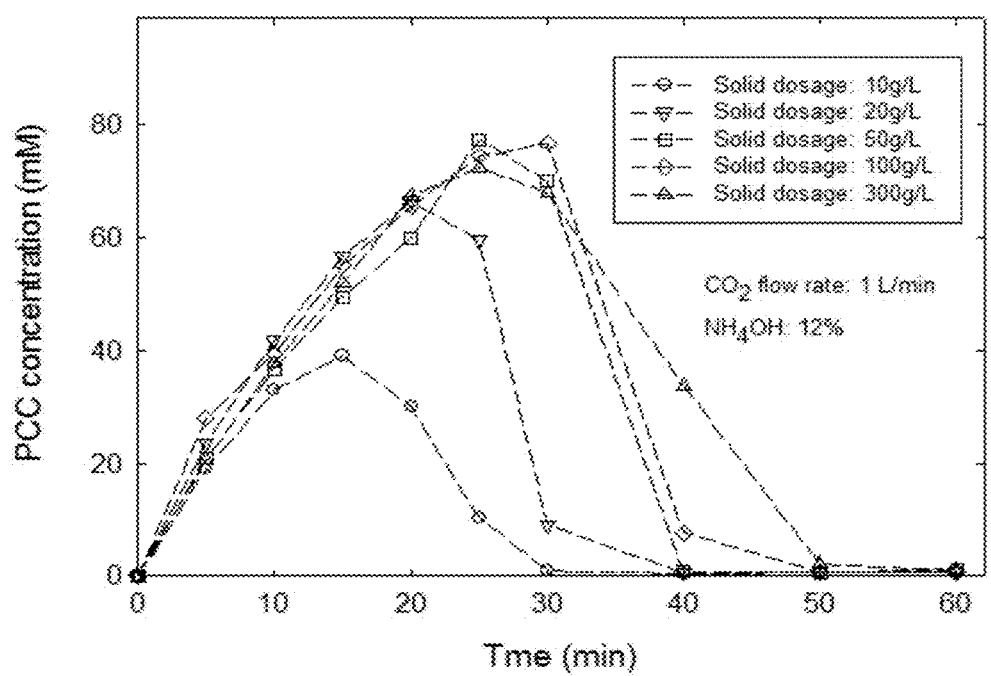
FIG. 18 is a graph showing the concentration of calcium carbonate according to a carbonation reaction time in the preparation method according to the present invention.

Formation Efficiency Analysis of Calcium Carbonate According to Solid Dosage of Desulfurization Gypsum In order to analyze the formation efficiency of calcium carbonate according to the solid dosage of the desulfurization gypsum in the preparation method of the present invention, the formation efficiency of the calcium carbonate was analyzed while changing the solid dosage (S/L) to 5 g/L, 10 g/L, 50 g/L, 100 g/L, 150 g/L, or 300 g/L under the conditions of 12% by volume of $NH_3$ and the $CO_2$ flow rate of 1 L/min, and the analysis results were shown in FIGS. 17 and 18.

As shown in FIG. 17, when the solid dosage was 5 g/L (total Ca concentration: 30 mM), the highest calcium carbonate formation efficiency was represented (90%). As the solid dosage was increased, the calcium carbonate formation efficiency was decreased. When the solid dosage was 10 g/L (total Ca concentration: 57 mM) or 20 g/L (total Ca concentration: 110 mM), the calcium carbonate formation efficiency was 68% or 60%, respectively. The formation of the calcium carbonate was adjusted according to the Ca concentration. FIG. 18 is a graph showing the concentration of the calcium carbonate according to the carbonation reaction time. If an amount of the desulfurization gypsum is increased, the ion pairs of the dissolved $Ca^{2+}$ and $CO_3^{2-}$ remain in a solution for a long time. This refers to that Ca ions are extracted for a longer time if a larger amount of desulfurization gypsum is fed. As shown in FIG. 18, when the solid dosage was 10 g/L, the highest calcium carbonate concentration was represented at a time of 15 min. However, the highest calcium carbonate concentration was represented at a time of 20 min in the case of the solid dosage of 20 g/L, and at a time of 30 min in the case of the solid dosage of 50 g/L Until now, the method of preparing calcium carbonate using a direct carbonation direction according to the present invention has been described in detail, those skilled in the art should understand that various modifications may be made without departing from the scope of the present invention.

Therefore, the scope of the present invention is not limited to the above-described embodiments, but determined by following appended claims and equivalents of the claims.

In other words, it should be understood that the present invention is not limited to the embodiments described above. The scope of the present invention will be limited by the appended claims. In addition, it will also be apparent to those skilled in the art that variations or modifications from the appended claims and the equivalent concept of the claims are included in the scope of the present invention.

What is claimed is:

1. A method of preparing calcium carbonate using a direct carbonation reaction, the method comprising:
    dissolving flue gas desulfurization gypsum into an ammonia solution;
    performing a filtering process to obtain a filtered solution after making a carbonation reaction by feeding carbon dioxide into the ammonia solution in which the flue gas desulfurization gypsum is dissolved; and
    performing a filtering process to obtain solid-phase calcium carbonate after precipitating the calcium carbonate by maintaining the filtered solution in a stationary state,
    wherein a solid dosage of the flue gas desulfurization gypsum to the ammonia solution is in a range of 5 g/L to 20 g/L,
    wherein the calcium carbonate includes vaterite crystals having 100% whiteness, and
    wherein the direct carbonation reaction is performed at normal temperature and normal pressure.

2. The method of claim 1, wherein an ammonia concentration in the ammonia solution is in a range of 4% by volume to 12% by volume.

3. The method of claim 1, wherein the dissolving of the flue gas desulfurization gypsum into the ammonia solution comprises performing an agitating process at a rate in a range of 350 rpm to 450 rpm for five minutes.

4. The method of claim 1, wherein a concentration of the flue gas desulfurization gypsum in the ammonia solution in which the flue gas desulfurization gypsum is in a range of 30 mM to 110 mM.

5. The method of claim 1, wherein the carbon dioxide is fed at a flow rate in a range of 1 L/min to 3 L/min.

6. The method of claim 1, wherein the carbonation reaction is performed for five minutes to 20 minutes.

7. The method of claim 1, wherein the carbonation reaction is completed at pH 7.

8. The method of claim 1, wherein the filtering process is performed by a 0.2 μm membrane filter.

9. The method of claim 8, wherein the 0.2 μm membrane filter includes cellulose acetate.

10. The method of claim 1, further comprising crystallizing the filtered solution after precipitating the calcium carbonate.

11. The method of claim 1, further comprising adjusting a pH of the ammonia solution, in which the flue gas desulfurization gypsum is dissolved, to at least 9.0 in the carbonation reaction.

\* \* \* \* \*